3,309,191
HERBICIDAL METHOD AND COMPOSITION
Edward D. Weil, Lewiston, and Jerome Linder, Niagara Falls, N.Y., assignors to Hooker Chemical Corporation, Niagara Falls, N.Y., a corporation of New York
No Drawing. Filed Nov. 26, 1963, Ser. No. 326,208
6 Claims. (Cl. 71—2.3)

This application is a continuation-in-part of our co-pending applications, S.N. 112,546, filed May 25, 1961, now U.S. Patent 3,112,346 and S.N. 284,828, filed June 3, 1963 now abandoned.

This invention relates to methods and compositions for controlling the growth of plants and to herbicidal compounds which may be employed in such processes and compositions. More particularly, the invention is of the use of certain ring-halogenated nitrostyrenes in processes and compositions for destroying undesirable plant growth and to novel 2,3,5,6-tetrahalo-β-nitrostyrenes.

In accordance with the present invention, a method for the control of undesirable plant growth, such as weeds, comprises applying to the locus to be treated a phytotoxic amount of a compound of the formula

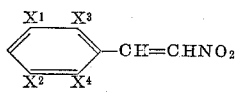

wherein $X^1$ and $X^2$ are selected from the group consisting of hydrogen and halogen and $X^3$ and $X^4$ are halogens. Compositions comprising such a material with an adjuvant such as a solvent, a surface active agent or a solid carrier or a mixture thereof, are also novel and part of the present invention. Also within the invention is the new compound

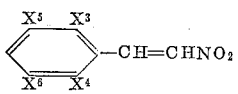

wherein $X^3$, $X^4$, $X^5$ and $X^6$ are halogens. The halogens referred to above include fluorine, chlorine, bromine and iodine and mixtures thereof, with chlorine being preferred. Exemplary of

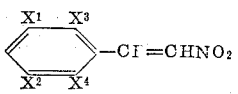

are 2,6-dichloro-β-nitrostyrene; 2,6-dibromo-β-nitrostyrene; 2-chloro-6-iodo-β-nitrostyrene; 2-chloro-6-bromo-β-nitrostyrene; 2,3,6-trichloro-β-nitrostyrene; 2,3,6-tribromo-β-nitrostyrene; 2,3,6-trifluoro-β-nitrostyrene; 2,3,5,6-tetrabromo-β-nitrostyrene; 2,3,5,6 - tetrachloro-β-nitrostyrene; 2,3,5,6-tetraiodo-β-nitrostyrene; 2,6-dichloro-3,5-difluoro-β-nitrostyrene; and the like.

In the herbicidal processes claimed, weeds, particularly broadleaf weeds, may be controlled and destroyed by pre-emergent and post-emergent treatments. The processes are particularly effective against grassy weed species associated with sugar cane (yet do not injure the cane), seedling Johnson grass, horsetail, puncture vine, bindweed, trumpet vine, sorrel and brush.

In such applications the herbicidal compounds may be employed in substantially pure form or as technical grades but usually will be formulated with solvents, surface active agents, solid carriers, usually powdered, or other herbicides.

The present herbicides exhibit a high solubility in oils such as diesel oils and petroleum oils generally. Most commercially available herbicides such as 2,4-D and other chlorinated aromatic acids and their salts, the chlorates, borates, trichloroacetates, and herbicidal arylureas are insoluble in oil solvents. This oil solubility is a significant advantage since the present oil compositions exhibit enhanced and much faster phytotoxic effect (as compared to aqueous or dry formulations), against recalcitrant weed species, which is manifested in several ways, such as by rapid foliar kill, long term repression of weed growth, and lower rates of application than would be necessary if the herbicide was to be formulated in a conventional water solution or emulsion. This latter advantage of lower rates of application is an important consideration, especially where the land to be treated is large in area and of low economic value such as is found in the scrub brush land of the Southwest, or the land bordering railroad rights-of-way.

An additional advantage of the novel method of this invention is that it lends itself to the use of various grades of purity, of the described halogenated β-nitrostyrenes, by themselves or in combination with other biologically active compositions. For example, these herbicidal compositions offer the advantage of compatability with a host of other herbicides including the tri- and tetrachlorophenylacetic acids and the sodium borates and calcium borates, 2,4-D and other herbicidal phenoxy aliphatic acids and esters, simazine and other herbicidal triazines, monuron, fenuron, diuron and other herbicidal ureas, herbicidal chlorates, herbicidal petroleum oils, hexachlorocyclopentadiene, pentachlorophenol, dinitro-o-alkylphenols, sodium trichloroacetate and sodium 2,2-dichloropropionate, and with various adjuvants and diluents well known to the art. Thus, these herbicides may be used by themselves or made the subject of liquid or solid formulations ranging from the very simple to the most elegant. For example, if it is desired, these compositions may be made into a liquid formulation by diluting, dispersing, dissolving or emulsifying with a surface active adjuvant or combination of these adjuvants in organic solvents such as petroleum hydrocarbons, alcohols, ketones, esters, glycols or combination thereof. Alternatively, the novel herbicides may be made up as solid formulations of powders, dusts, wettable dusts, granules and pellets using solid diluents such as talcs, clays, flours, starches, diatomaceous earths, mica, alkaline earth limes, carbonates and phosphates either finely divided, granular or pelleted in form. These solid and liquid formulations facilitate handling and application and sometimes enhance herbicidal activity to more than an additive degree.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. By the term surface active agents are meant wetting agents, dispersing agents, emulsifying agents and the like. A satisfactory but not complete list of such agents is set forth in an article in "Soap and Chemical Specialties," vol. 31, No. 7, pages 50–61; No. 8, pages 48–61; No. 9, pages 52–67, and No. 10, pages 38(67) 1955. Other adjuvant materials are mentioned in Bulletin E–607 of the Bureau of Entomology and Plant Quarantine of the United States Department of Agriculture.

Usually, the proportions of either the solvent medium or solid carrier to herbicidally active material will be within the range of 1:1 to 1,000:1, preferably 3:1 to 200:1. The proportions of surface active agent to herbicide will usually be from 0.1:1 to 100:1, preferably about 0.1:1 to 10:1.

While the manners and methods of application of this invention and the inventive compositions is varied and largely dependent upon the climatic conditions, crop treated, the weeds to be eradicated, the equipment available and the convenience of the user, a preferred embodiment of this invention is to apply the described herbicides as a spray after making up a liquid formulation comprised of several times the active ingredient weight of a petroleum hydrocarbon solvent such as petroleum naphtha, kerosene, diesel oil, xylene, "weed oil," fuel oil, etc., optionally with small quantities of an emulsifier such as a commercial polyoxyethylene ether and a surfactant such as alkylaryl sulfonate mixture. This type of mixture is either sprayed without further dilution or is emulsified with water and sprayed on the locus to be treated, which is the weed population or the soil where weed growth is to be prevented.

The rate of application of the present herbicidal compositions will be varied according to the varying degrees of resistance possessed by the weed species and crop, the stage of weed and crop growth and the soil type and climatic conditions, but in general, the rates will be at least one quarter of a pound of herbicide per acre and will seldom exceed four hundred pounds per acre with the preferred falling within five-tenths to fifty pounds per acre. Where the weeds or brush are in an early stage of growth, being more susceptible, they will frequently respond to the rates from ½ to 10, even one-half to four pounds per acre. Such rates (½ to 10 pounds per acre) with the present herbicides, allow selective weed control, destroying objectionable weeds but allowing crops such as sugar cane, corn, various grains, turf grasses and woody plants to be grown in the treated soil. Such selectivity of action is a valuable and surprising property of these compounds. Older weeds or brush that are to be totally eradicated may require rates in excess of ten pounds per acre, e.g., 10 to 100 pounds acre, to be destroyed. In those instances where well established brush is encountered or where the weed population has been allowed to accumulate unchecked or where mature plants are encountered, applications of up to fifty and even beyond this rate may be required. For eradication of deeply-rooted herbicide-resistant perennial weeds such as field bindweed or for long term sterilization, rates of ten pounds up to several hundred pounds per acre may be used and all vegetation at the locus is destroyed. The compounds and compositions of the invention may also be employed at sub-lethal rates to produce a stunting of plants. For example, the growth of brush under power lines may be retarded in this way.

The 2,3,5,6-tetrahalo-β-nitrostyrene is a waxy off-white solid which is prepared by the reaction of nitromethane with 2,3,5,6-tetrachlorobenzaldehyde in the presence of a base. Suitable bases include, but are not limited to caustic soda, potash, sodium alkoxides, sodium hydride, lime, or strong basic tertiary amines such as tetramethylguanidine. The above process gives acceptable yields at temperatures ranging from about zero degrees centigrade to about one hundred degrees centigrade, and is usually completed in less than two or three hours. The final product is ordinarily isolated from the reaction mixture by diluting with water, neutralizing with acid and extracting with a water immiscible solvent such as a suitable aromatic solvent. The solvent may be removed by evaporation and, when purified material is desired, distillation and/or crystallization is utilized. Where the material is destined for herbicidal use, the solvent extract may be used directly and no further purification is required.

The examples which follow are intended to illustrate the workings of this invention, but are not to be construed as limiting this invention in any manner whatsoever, except as provided by the specification and the claims.

*Example 1.—Preparation of 2,3,5,6-trichloro-β-nitrostyrene*

A solution of 62 grams of nitromethane and 244 grams of 2,3,5,6-tetrachlorobenzaldehyde in two hundred cc. of methanol is cooled to ten to fifteen degrees centigrade. At this temperature, forty-two grams of caustic soda in one hundred and forty-two cc. of water is added slowly, keeping the temperature at fifteen degrees centigrade or less. After one hour, all the materials are completely soluble and the contents solidify out within thirty minutes. Three liters of water is added to the solution, whereby the entire contents become homogeneous. The resulting solution is acidified with a solution consisting of two hundred cc. of concentrated hydrochloric acid in three hundred cc. of water. The resulting material is extracted with benzene and the benzene is removed by distillation. The resulting product is distilled and an off-white waxy solid results which gives an analysis for 2,3,5,6-tetrachloro-β-nitrostyrene.

By the same method, except for the use of 210 grams of 2,3,6-trichlorobenzaldehyde, instead of 244 grams 2,3,5,6-tetrachlorobenzaldehyde, 2,3,6-trichloro-β-nitrostyrene is made. It melts at 68.5 to 70 degrees centigrade and is of the correct chlorine and nitrogen analyses for 2,3,6-trichloro-β-nitrostyrene. In similar manner the corresponding other halo-substituted nitrostyrenes are made, using the requisite gram-mole of 2,3,5,6-tetrabromobenzaldehyde, 2,6-dibromobenzaldehyde, 2,3,6-trifluorobenzaldehyde and 2,6-dichloro-3,5-diiodobenzaldehyde.

*Example 2.—Herbicidal oil formulation of 2,3,6-trichloro-β-nitrostyrene*

The following were mixed:

Diesel oil _____gallons__ 10
2,3,6-trichloro-β-nitrostyrene _____pounds__ 1

The components were blended to make a homogeneous solution.

When sprayed at the rate of eighty gallons per acre on honeysuckle and trumpet vine, this formulation produces complete kill within one week and no regrowth occurred within six months. With the oil only, transitory foliar burn occurs, followed by development of a new healthy foliage, within several weeks.

Similar formulations are made with the other compounds of Example 1 and have a like effect.

*Example 3.—Emulsifiable formulation*

The following are mixed to a homogeneous blend:

Pounds
2,3,6-trichloro-β-nitrostyrene _____ 2
Emulsifier (sodium alkylnaphthalene-sulfonate-sorbitan laurate polyoxyethylene ether) _____ 0.4
Heavy aromatic naphtha solvent to make 1 gallon.

Similar formulations are also made with 2,3,5,6-tetrachloro- and 2,3,5,6-tetrabromo-β-nitrostyrene.

The 2,3,6-trichloro-β-nitrostyrene formulation, emulsified in one hundred gallons of water, is sprayed preemergence on to land infested with ragweed at two pounds of 2,3,6-trichloro-β-nitrostyrene per acre. Essentially one hundred percent control of ragweed is obtained for a four month period.

*Example 4.—Preparation of emulsifiable formulation*

The folowing ingredients are blended together:

Pounds
2,6-dichloro-β-nitrostyrene _____ 2
Emulsifier (alkylarylsulfonate-polyoxyethyelene sorbitol ester blend) _____ 0.5
Heavy aromatic naphtha to make 1 gallon total.

The result is a clear solution emulsifiable with water, the phytotoxic emulsion thus prepared being sprayed onto weed infestations.

*Example 5.—Granular formulation*

Granular clay of twenty-four to forty mesh size is tumbled and sprayed evenly with molten 2,3,6-trichloro-β-nitrostyrene or the other compounds of Example 1 until ten percent by weight thereof has been impregnated on the clay.

Such a formulation, when spread evenly at the rate of two hundred pounds of granules per acre of land infested with field bindweed gives better than ninety percent control of the bindweed within six months.

*Example 6.—Preparation of granular formulation*

A solution of 1 pound of 2,3,5,6-tetrachloro-β-nitrostyrene in acetone is sprayed onto 9 pounds of granular attapulgus clay in a rotating drum and the granules are then heated to drive off the acetone, leaving behind a dry free-flowing 10% granular formulation of the herbicide, which is applied directly to weed infestations to kill the weeds, using a fertilizer spreader or similar equipment.

*Example 7.—Control of perennial weeds*

2,3,6-trichloro-β-nitrostyrene are applied at twenty-five pounds per acre in early spring to a heavy infestation of field bindweed. Six months later, substantially complete kill of the bindweed is noted. Similar action results from treatment with 2,3,5,6-tetrachloro-β-nitrostyrene.

*Example 8.—Pre-emergence weed control in sugar cane*

2,3,6-trichloro-β-nitrostyrene is applied to four pounds per acre on disked land at the time of planting sugar cane. The area used has a natural infestation of Johnson grass seedlings. After two months, essentially complete control of Johnson grass seedlings is noted with no damage to sugar cane. Like results are obtained with other of the herbicides of Example 1.

*Example 9.—Pre-emergence weed control*

2,3,6-trichloro-β-nitrostyrene is sprayed (in aqueous emulsion), pre-emergence onto weed infested soil at the rate of eight pounds per acre. One month later, one hundred percent control is noted of the following weeds: quackgrass, foxtail, ryegrass, crabgrass, Johnson grass, dock, mustard and chickweed. Field corn planted is the treated area is not significantly damaged.

*Example 10.—Post-emergence weed control*

2,3,6-trichloro-β-nitrostyrene is sprayed at the rate of eight pounds per acre in aqueous emulsion on a mixed weed population. One month later, complete kill is noted with dock, mustard, pigweed, lambsquarters, chickweed, and crabgrass.

All temperatures given herein are in degrees centigrade and all parts and percentages are by weight, unless otherwise indicated.

The invention has been described with respect to illustrations and examples thereof but is not so limited. To one of skill in the art it will be evident that modifications thereof may be made and equivalents may be substituted therein without departing from the spirit of the invention or being outside the purview of the claims.

What we claim is:

1. A method for the control of weeds which comprises applying to a locus to be treated a growth controlling amount of at least one herbicidal compound of the structure

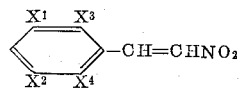

wherein $X^1$ is selected from the group consisting of hydrogen and halogen, and wherein $X^2$, $X^3$ and $X^4$ are halogen atoms.

2. A method according to claim 1, wherein the herbicide employed is 2,3,6-trichloro-β-nitrostyrene and it is applied in a phytotoxic amount.

3. A method according to claim 1, wherein the herbicide employed is 2,3,5,6-tetrachloro-β-nitrostyrene and it is applied in a phytotoxic amount.

4. A herbicidal composition comprising a growth retarding proportion of a herbicide of the formula

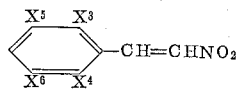

wherein $X^3$, $X^4$, $X^5$ and $X^6$ are independently selected halogens, and at least one adjuvant selected from the group consisting of a solvent, a solid carrier and a surface active agent.

5. A herbicidal composition according to claim 4, wherein the herbicide is 2,3,5,6-tetrachloro-β-nitrostyrene.

6. A herbicidal composition comprising a growth retarding proportion of 2,3,6-trichloro-β-nitrostyrene and at least one adjuvent selected from the group consisting of a solvent, a solid carrier and a surface active agent.

References Cited by the Examiner
UNITED STATES PATENTS

| | | | |
|---|---|---|---|
| 2,335,384 | 11/1943 | Bousquet et al. | 167—22 |
| 2,864,679 | 12/1958 | Hamm et al. | 71—2.3 |
| 3,063,821 | 11/1962 | Weil | 71—2.3 |
| 3,110,738 | 11/1963 | Schmerling | 260—645 |
| 3,132,184 | 5/1964 | Hyman | 260—645 |

ELBERT L. ROBERTS, *Primary Examiner.*

JAMES O. THOMAS, JR., *Examiner.*